June 25, 1946.   E. H. CUSHMAN   2,402,535
AUXILIARY JAW ELECTRODE HOLDER
Filed May 25, 1945
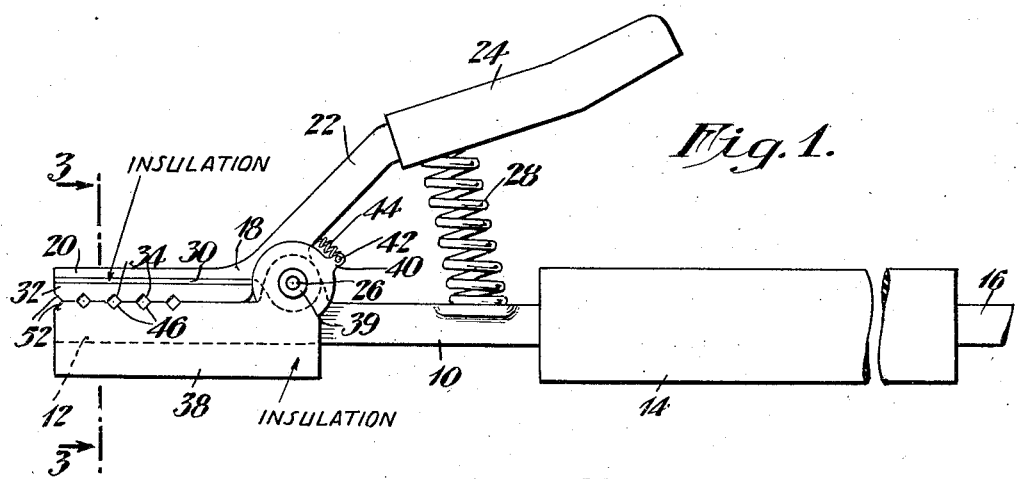
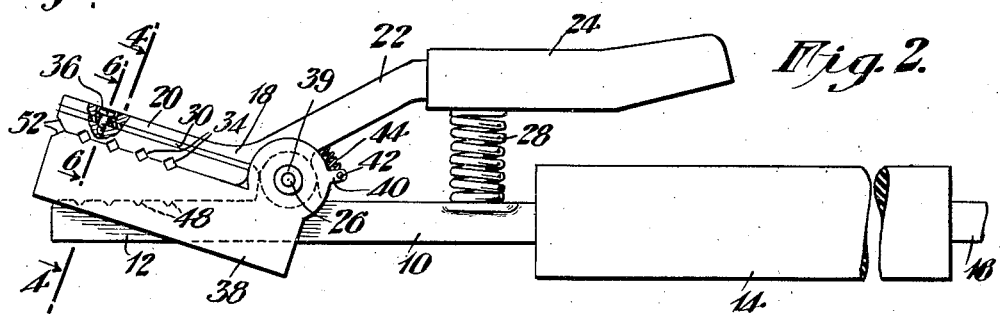
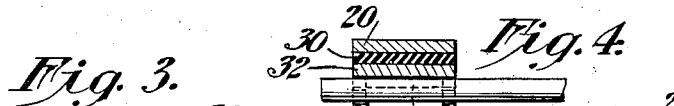
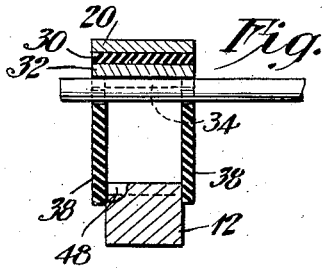
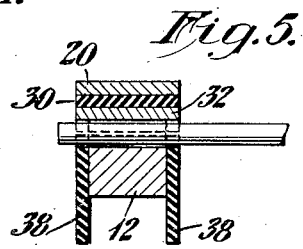
INVENTOR
EVERETT H. CUSHMAN
BY
ATTORNEYS Patented June 25, 1946

2,402,535

UNITED STATES PATENT OFFICE 2,402,535

AUXILIARY JAW ELECTRODE HOLDER

Everett H. Cushman, New York, N. Y., assignor to Air Reduction Company, Incorporated, a corporation of New York Application May 25, 1945, Serial No. 595,822

9 Claims. (Cl. 219—8)

This invention relates to improvements in electrode holders, and more particularly to an improved jaw type electrode holder for use in arc welding operations.

In using electrode holders of this type in arc welding, it is necessary to change electrodes when they are consumed, and according to the usual practice the jaws of the holder are opened and the stub of the electrode is ejected. The operator inserts a new electrode by holding it in his gloved hand and clamping it between the jaws of the holder. The electrode-gripping means is "live" during this operation, and the glove serves to insulate the operator from the welding current. However, such practices are dangerous because the glove may be damaged or wet, or the operator may neglect to use the glove. The electric switch used in connection with such welding operations is usually so remote as to make it impracticable to shut off the current each time a new electrode is inserted.

Proposals have been made to provide electrode holders of this type with switches so that current may be turned off at the holder before changing electrodes. However, the heavy current carried by such electrode holders requires such a large contactor that any switch for this purpose must be so large as to be unwieldy if it is made a part of the holder. A remote switch operated from the holder would be impracticable and too expensive.

The primary object, therefore, of the present invention, is to provide an improved jaw type electrode holder in which the problems presented above are overcome.

A further object of the invention is to provide an improved jaw type electrode holder for arc welding which will insure safety to the operator in changing electrodes.

According to the present invention a two-jaw electrode holder is provided with a third or auxiliary jaw of insulating material which is arranged to cooperate with an insulated portion of the upper jaw to hold the electrode away from the live lower jaw, when the movable handle of the holder is depressed in the usual way to open the two main jaws. In this position of the jaws the electrode is out of circuit and hence "dead," so the electrode-stub may be safely removed by releasing it from the grip of the auxiliary jaw and the upper jaw, and a new electrode may be inserted between them and thereafter brought by them into contact with the live jaw when the movable handle of the holder is released.

An electrode holder embodying the invention is illustrated in the accompanying drawing, in which:

Fig. 1 is a side elevation of the improved electrode holder with the jaws in closed position.

Fig. 2 is a view similar to Fig. 1 showing the movable handle of the holder depressed and the main jaws in open position, a part of the upper jaw being shown in section.

Fig. 3 is a vertical cross-section taken on the line 3—3 of Fig. 1.

Fig. 4 is a cross-section taken on the line 4—4 of Fig. 2, but in this figure an electrode is shown gripped between the auxiliary jaw and upper jaw and held by them out of contact with the lower jaw.

Fig. 5 is a view similar to Fig. 3 showing an electrode held in normal position in the electrode holder.

Fig. 6 is an enlarged transverse section taken on the line 6—6 of Fig. 2.

Referring to the drawing, the improved electrode holder includes a relatively long metal bar or arm 10 the left end 12 of which constitutes the lower live jaw of the holder. This jaw is of rectangular cross-section as shown in Fig. 3. The bar 10 extends into an enlarged handle portion 14 of insulating material in which it is connected to a conductor 16 for supplying the welding current. The holder includes an upper jaw 18 comprising a flat metal jaw plate 20 which is somewhat wider than the jaw 12 as shown in Fig. 3. The plate 20 is integral with or connected to a movable handle 22 which is provided with a cover 24 of insulating material. The handle 22 and jaw 18 are pivoted or hinged to the bar 10 by suitable lugs and bearings and a hinge pin 26 as shown. The handle 22 is urged away from the bar 10, and the upper and lower jaws of the holder are urged together by means of a relatively heavy coil spring 28 mounted between the handle 22 and the bar 10.

The upper jaw of the electrode holder includes a layer of insulating material 30 directly under the plate 20 and a lower metal jaw section 32 provided in its lower surface with inverted V-shaped channels or grooves 34. The insulation 30 and the metal jaw member 32 are held to the upper plate 20 by means of one or more screws 36 which are completely insulated from the plate 20 in the manner shown in Fig. 6. The upper jaw construction therefore includes an upper metal member 20 which is "live" when the current is on, regardless of the position of the jaws and a metal member 32 which constitutes an insulated portion of the upper jaw and which is dead when the current is on and when the two main jaws 12 and 18 are open.

The third or auxiliary jaw of the holder includes a relatively wide sheet of insulating material 38 mounted on each side of the lower jaw 12 and pivoted on the hinge pin 26 and held thereon by retaining washers 39 in the manner shown. The jaw members 38 are each provided with a projecting lug 40 which extends rearwardly between the bar 10 and the handle 22, the lugs 40 being opposite each other and connected by a cross-rod 42. A coil spring 44 is positioned between the under side of the handle 22 and the rod 42. The auxiliary jaw members 38 are provided with V-shaped notches 46 opposite the channels 34, and the jaw 12 is provided with V-shaped channels 48 which match the channels 34.

It will now be seen that by depressing the movable handle 22 the upper jaw 18 can be moved to the open position shown in Fig. 2, and due to the spring 44, which is stiff enough for the purpose, the members 38 of the auxiliary jaw will move with it. If in the closed position of the main jaws they are gripping an electrode stub in one of the channels 34 of the upper jaw and one of the corresponding channels of the lower live jaw, as shown in Fig. 5, the movement of the upper jaw and the auxiliary jaw to the position shown in Fig. 2 will cause the side members of the auxiliary jaw to lift the electrode away from the live lower jaw as shown in Fig. 4. The electrode is now in contact only with the insulated portion of the upper jaw and the insulated auxiliary jaw between which it is gripped, and it is therefore dead. Consequently, it may be safely removed and a new electrode safely inserted by pressing the end of the new electrode into a V-groove 52 at the end of the members 32 and 38 to force the auxiliary jaw members 38 down to release the electrode stub and permit the new electrode to move into position in one of the cross-channels 34 and the corresponding notch 46. After the new electrode is in position between the insulated portion of the upper jaw and the insulated auxiliary jaw, the operator releases the handle 24 and closes the jaws, whereupon the electrode is brought into contact with the live lower jaw 12 (Fig. 5).

The lugs 40 and the cross-rod 42 are so positioned with respect to the handle 22 that when the main jaws 12 and 18 are fully open, the auxiliary jaw members 38 cannot be forced down far enough to bring their upper edges to the level of the top surface of the live jaw 12, as will be apparent from the relationships shown in Fig. 2. Therefore, in positioning the new electrode it cannot touch the live lower jaw. The positioning of the bar 42 in this manner with respect to the handle 22 will also force the auxiliary jaw members 38 to lift the electrode stub from the jaw 12, even though it may have been "frozen" to this jaw. This result will be achieved even though the force of the spring 44 is of itself insufficient to achieve it.

The improved jaw-type electrode holder of the present invention is of relatively simple construction and easy to manufacture. At the same time the provision of the auxiliary jaw of insulating material in conjunction with the insulated portion of the upper jaw gives an electrode holder which is safe to operate and which comes as an answer to the problems hereinbefore mentioned. If desired, additional safety may be provided by covering with insulation all of the live metal parts of the holder shown as exposed and uncovered in the drawing.

I claim:

1. An electrode holder comprising a pair of pivotally connected main jaws adapted in their closed position to grip an electrode between them, means for conducting electric current to one of the jaws to make it a live jaw, at least the electrode-gripping portion of the second jaw being insulated, an auxiliary jaw pivotally mounted with respect to each of the main jaws and having a portion which cooperates with the insulated portion of said second jaw to grip an electrode when the main jaws are in open position, at least the electrode-gripping portion of the auxiliary jaw being insulated, and means for yieldingly urging the auxiliary jaw and said second jaw together whereby when the two main jaws are opened the electrode will continue to be gripped between the auxiliary jaw and said second jaw and will be moved by them away from the live jaw in which position of the auxiliary jaw and second jaw they may be separated for removal of a used electrode and for insertion between them of a new electrode to be moved into contact with the live jaw when the main jaws are again closed.

2. An electrode holder comprising a pair of pivotally connected main jaws adapted in their closed position to grip an electrode between them, a handle associated with said jaws by means of which they can be relatively opened and closed, means for conducting electric current to one of the jaws to make it a live jaw, at least that portion of the second jaw which grips the electrode being insulated, an auxiliary jaw of insulating material pivotally mounted with respect to each of the main jaws, and means for yieldingly urging the auxiliary jaw and said second jaw together whereby when the two main jaws are opened the electrode will continue to be gripped between the auxiliary jaw and said second jaw and will be moved by them away from the live jaw in which position of the auxiliary jaw and second jaw they may be separated for removal of a used electrode and for insertion between them of a new electrode to be moved into contact with the live jaw when the main jaws are again closed.

3. In an electrode holder, a fixed jaw adapted to carry welding current, a movable jaw cooperating with said fixed jaw and being of greater lateral width than the fixed jaw so that its side portions project laterally beyond the fixed jaw, said movable jaw including a metal plate arranged to engage said fixed jaw and insulated from the remainder of said movable jaw, an auxiliary jaw of insulating material having a portion extending along each side of said fixed jaw and abutting the under surface of said laterally projecting side portions of the movable jaw, and means normally biasing said portions of the auxiliary jaw against said under surface of the movable jaw.

4. In an electrode holder, the combination of upper and lower jaws pivotally connected, the upper of said jaws having an electrode-gripping surface cooperating with the electrode-gripping surface of the lower jaw, said electrode-gripping surface of the upper jaw being insulated from the remainder of the upper jaw, a plate of insulating material extending along each side of said lower jaw and pivoted on the pivot of said upper and lower jaws, the upper jaw having laterally projecting portions for engaging the upper edges of said plates of insulating material, and means normally biasing said plate against said laterally projecting portions of the upper jaw.

5. In an electrode holder, the combination of upper and lower jaws pivotally connected, said jaws having cooperating electrode-gripping surfaces, a plate of insulating material extending along each side of said lower jaw and pivoted on the pivot of said upper and lower jaws, the upper jaw having laterally projecting portions for engaging the upper edges of said plates, a lug on each of said plates projecting back of said pivot, a cross-bar connecting said lugs, and means acting on said bar normally biasing said plates against said laterally projecting portions of the upper jaw.

6. In an electrode holder, the combination of two main electrode-holding jaws pivotally connected, said jaws having electrode-gripping surfaces, an auxiliary jaw of insulating material having a side portion extending along each side of one of said main jaws and pivoted on the pivot of the main jaws, laterally projecting portions on one of said main jaws for engaging the edges of said side portions of the jaw, said auxiliary jaw including a projection back of said pivot, and means engaging said projection for biasing said edges of the side portions of the auxiliary jaw against said laterally projecting portions on one of the main jaws.

7. In an electrode holder, a movable upper jaw pivoted with respect to a lower jaw having substantially straight sides, said upper jaw having a metal electrode-engaging plate insulated from the remainder of the jaw, said plate having somewhat greater lateral width than said lower jaw to provide a portion projecting laterally beyond each side of the lower jaw, a plate of insulating material extending along each side of said lower jaw and having a pivot in common with said upper and lower jaws, the upper edges of said plates of insulating material being adapted to abut the laterally projecting under surface of the electrode-engaging plate of the upper jaw, means normally biasing said upper edges of the plates of insulating material against the laterally projecting under surface of the electrode-engaging plate, whereby said plates of insulating material are adapted to lift an electrode away from said lower jaw upon the opening of said upper and lower jaws.

8. In an electrode holder including upper and lower jaws having electrode-gripping faces, the electrode-gripping face of the upper jaw being insulated from the remainder of the jaw, an auxiliary jaw of insulating material having portions extending along the sides of the lower jaw and including electrode engaging upper edges, and means normally biasing said auxiliary jaw toward the upper jaw, said portions of the auxiliary jaw projecting substantially below said lower jaw when the upper and lower jaws are in closed position.

9. An electrode holder in accordance with claim 1 in which means are provided operative in the open position of the main jaws to prevent sufficient separation of the auxiliary jaw and the second main jaw to allow the electrode to make contact with the live main jaw when the electrode is being inserted between the auxiliary and second jaws or removed from them.

EVERETT H. CUSHMAN.